United States Patent
Morikawa (10) Patent No.: US 6,424,747 B1
(45) Date of Patent: *Jul. 23, 2002

(54) METHOD OF AND APPARATUS FOR PROCESSING IMAGE DATA

(75) Inventor: Seiichiro Morikawa, Hiratsuka (JP)

(73) Assignee: Fuji Photo Film Co., Ltd., Kanagawa-ken (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/193,716

(22) Filed: Nov. 17, 1998

(30) Foreign Application Priority Data

Nov. 20, 1997 (JP) .............................. 9-320014

(51) Int. Cl.$^7$ ................................. G06K 9/76
(52) U.S. Cl. ...................... 382/210; 358/522
(58) Field of Search ................ 382/210, 260, 382/261, 262, 263, 264; 358/518, 521, 522, 523, 524, 530, 532

(56) References Cited

U.S. PATENT DOCUMENTS

| | | | | |
|---|---|---|---|---|
| 5,297,036 A | * | 3/1994 | Grimaud | 364/413.13 |
| 5,710,827 A | * | 1/1998 | Perumal | 382/167 |
| 5,717,791 A | * | 2/1998 | Labaere | 382/274 |
| 5,809,213 A | * | 9/1998 | Bhattacharjya | 395/106 |
| 5,887,080 A | * | 3/1999 | Tsubusaki | 382/172 |

* cited by examiner

Primary Examiner—Jerome Grant
(74) Attorney, Agent, or Firm—Sughrue Mion, PLLC (57) ABSTRACT

A smoothing circuit smoothes lookup tables generated by a color conversion table generator, using a filter function selected from a filter function storage circuit, and supplies smoothed lookup tables to a color processing circuit. Density data supplied from a calibration circuit are converted into halftone dot % data according to the smoothed lookup tables. The halftone dot % data are interpolated and then converted into LD control data, which are supplied to laser diodes.

17 Claims, 7 Drawing Sheets

| | dM → | | |
|---|---|---|---|
| dC ↑ | 1 | 1 | 1 |
| | 1 | 1 | 1 |
| | 1 | 1 | 1 |

FIG. 4B dY=0

| | dM → | | |
|---|---|---|---|
| dC ↑ | 1 | 1 | 1 |
| | 1 | 1 | 1 |
| | 1 | 1 | 1 |

FIG. 4C dY=1

| | dM → | | |
|---|---|---|---|
| dC ↑ | 1 | 1 | 1 |
| | 1 | 1 | 1 |
| | 1 | 1 | 1 |

FIG. 5A dY=-1

| | dM → | | |
|---|---|---|---|
| dC ↑ | t | t | t |
| | t | t | t |
| | t | t | t |

FIG. 5B dY=0

| | dM → | | |
|---|---|---|---|
| dC ↑ | t | t | t |
| | t | 1 | t |
| | t | t | t |

FIG. 5C dY=1

| | dM → | | |
|---|---|---|---|
| dC ↑ | t | t | t |
| | t | t | t |
| | t | t | t |

FIG. 6A
dY=-1

| | | |
|---|---|---|
| 0 | 1 | 0 |
| 1 | 1 | 1 |
| 0 | 1 | 0 | dC ↑    → dM

FIG. 6B
dY=0

| | | |
|---|---|---|
| 1 | 1 | 1 |
| 1 | 1 | 1 |
| 1 | 1 | 1 | dC ↑    → dM

FIG. 6C
dY=1

| | | |
|---|---|---|
| 0 | 1 | 0 |
| 1 | 1 | 1 |
| 0 | 1 | 0 | dC ↑    → dM

FIG. 7A
dY=-1

| | | |
|---|---|---|
| 0 | 0 | 0 |
| 0 | 1 | 0 |
| 0 | 0 | 0 | dC ↑    → dM

FIG. 7B
dY=0

| | | |
|---|---|---|
| 0 | 1 | 0 |
| 1 | 1 | 1 |
| 0 | 1 | 0 | dC ↑    → dM

FIG. 7C
dY=1

| | | |
|---|---|---|
| 0 | 0 | 0 |
| 0 | 1 | 0 |
| 0 | 0 | 0 | dC ↑    → dM

FIG. 8

METHOD OF AND APPARATUS FOR PROCESSING IMAGE DATA

BACKGROUND OF THE INVENTION

1. Field of the Invention

The present invention relates to a method of and an apparatus for converting input image data into output image data with conversion data established according to desired image processing conditions.

2. Description of the Related Art

In DTP (desktop printing), printing, and platemaking industries, there has widely been used a color image input and output system for obtaining input image data by reading a color subject with a scanner, effecting desired image processing on the input image data to generate output image data, and outputting a color image based on the output image data from an image output device such as a color printer, a CRT (cathode-ray tube), or the like.

The color image input and output system usually has color conversion function established with image processing conditions used as parameters. By establishing image processing conditions depending on an image, color conversion functions are defined to generate conversion data, and the input image data is subjected to desired image processing using the conversion data. The image processing conditions may include the type of subject image, density settings for highlights and shadows with respect to the input image data, and color correcting coefficients for color correction.

When an image is outputted on the basis of image data processed using conversion data thus established, if color conversion functions are established inappropriately, the output image may contain unnatural regions such as tone jumps. Specifically, color conversion functions described parametrically may not necessarily be established in a manner to be able to convert all image data highly accurately. For example, since conversion data established as a lookup table based on color conversion functions convert input image data into discrete output image data, an image with smaller density variations may suffer tone jumps due to large gradation changes.

SUMMARY OF THE INVENTION

It is a general object of the present invention to provide a method of and an apparatus for processing image data so as to be able to generate such conversion data which will not lower the gradation quality of an output image.

A major object of the present invention is to provide a method of and an apparatus for processing image data so as to be able to reduce tone jumps in images with smaller density changes and to maintain desired gradation reproducibility with respect to images with larger density changes.

Another object of the present invention is to provide a method of and an apparatus for processing image data so as to be able to smooth densities that are selected as desired.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
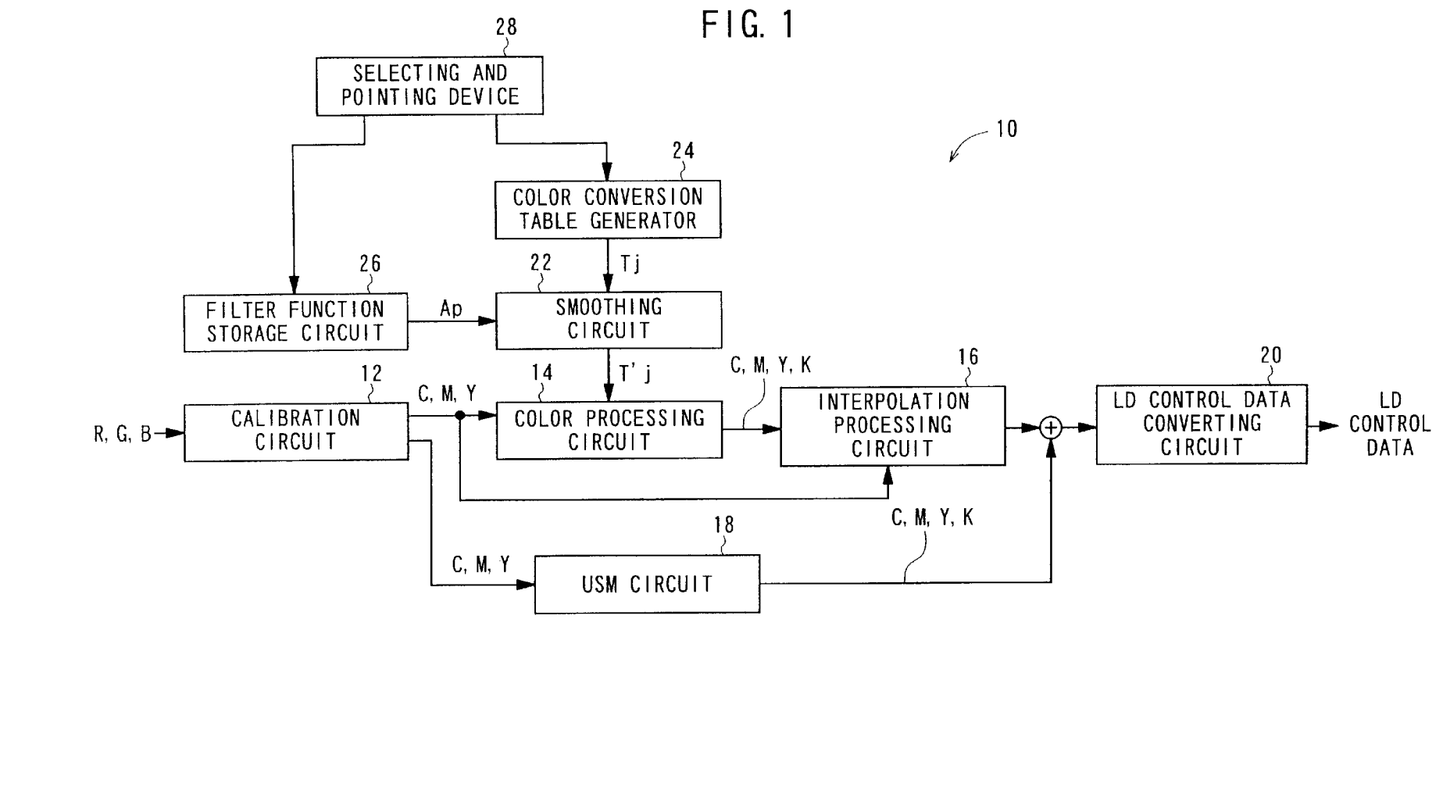
FIG. 1 is a block diagram of a color image processing system incorporating a method of and an apparatus for processing image data according to the present invention.

As shown in FIG. 1, a color image processing system 10 incorporating a method of and an apparatus for processing image data according to the present invention generally comprises a calibration circuit 12, a color processing circuit 14, an interpolation processing circuit 16, a USM (UnSharp Masking) circuit 18, and an LD (Laser Diode) control data converting circuit 20. The color image processing system 10 converts image data R, G, B supplied from a scanner or the like into laser diode control data according to image processing conditions. Laser diodes (not shown) are controlled by the laser diode control data to produce a color image on a recording medium.

The calibration circuit 12 has correction tables for the respective image data R, G, B, and converts the image data R, G, B into density data C, M, Y according to the corresponding correction tables. The correction tables are established such that density data C, M, Y obtained by reading a calibration chart will become designated densities of the calibration chart.

The color processing circuit 14 effects various types of processing including establishment of densities of highlights and shadows, conversion of the gradations of colors, adjustment of a gray balance, color correction, and generation of density data K according to UCR (Under Color Removal), using conversion data established as lookup tables. Therefore, the density data C, M, Y supplied from the calibration circuit 12 are converted by the color processing circuit 14 into desired halftone dot % data C, M, Y, K according to the conversion data.

The interpolation processing circuit 16 interpolates the halftone dot % data C, M, Y, K supplied from the color processing circuit 14. Specifically, the color processing circuit 14 effects a color conversion process on 5 high-order bits of the density data C, M, Y supplied from the calibration circuit 12, and the interpolation processing circuit 16 interpolates the halftone dot % data C, M, Y, K based on 5 low-order bits of the density data C, M, Y. The process thus carried out by the interpolation processing circuit 16 can reduce the burden on the color processing circuit 14.

The USM circuit 18 generates USM data of density data C, M, Y, K from the density data C, M, Y, and adds the USM data to the halftone dot % data C, M, Y, K outputted from the interpolation processing circuit 16 for thereby effecting edge enhancement on the halftone dot % data C, M, Y, K.

The LD control data converting circuit 20 converts the edge-enhanced halftone dot % data C, M, Y, K into LD control data. The LD control data controls the laser diodes to generate images corresponding to the respective colors C, M, Y, K on a recording medium.

The color processing circuit 14 is supplied with smoothed conversion data as lookup tables T'j (j=C, M, Y, K) from a smoothing circuit 22. The smoothing circuit 22 smoothes conversion data supplied as lookup tables Tj from a color conversion table generator 24 using a filter function Ap which are supplied from a filter function storage circuit 26. The color conversion table generator 24 selects or establishes a plurality of color conversion functions described parametrically with a selecting and pointing device 28 such as a keyboard, a mouse, or the like, thereby generating the lookup tables Tj. The filter function Ap stored in the filter function storage circuit 26 is also selected by the selecting and pointing device 28.

Figure 2:
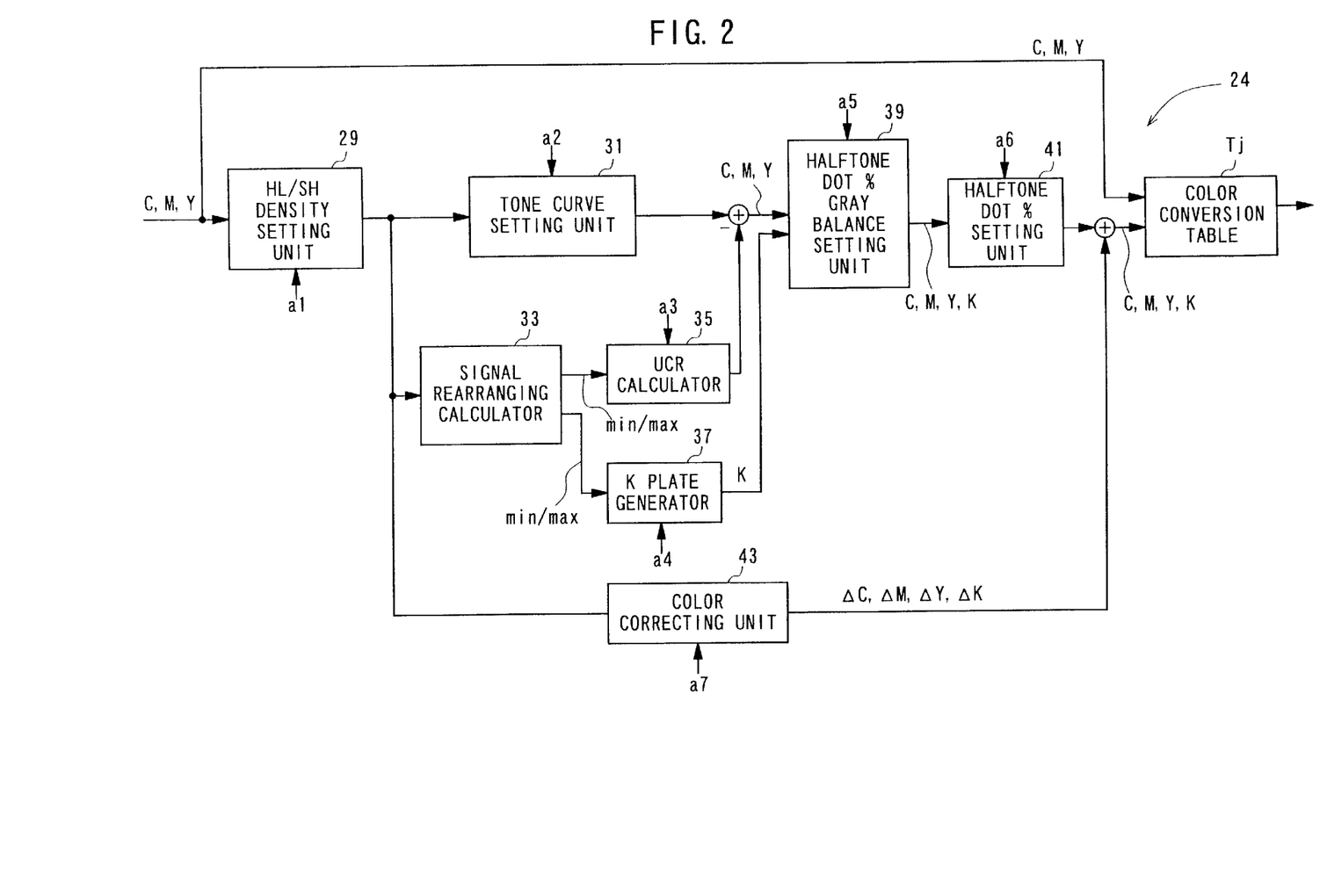
FIG. 2 is a block diagram of a color conversion table generating circuit of the color image processing system shown in FIG. 1.

As shown in FIG. 2, the color conversion table generator 24 comprises an HL/SH (HighLight/SHadow) density setting unit 29, a tone curve setting unit 31, a signal rearranging calculator 33, an UCR calculator 35, a K plate generator 37, a halftone dot % gray balance setting unit 39, a halftone dot % setting unit 41, and a color correcting unit 43. The color conversion table generator 24 generates the lookup tables Tj as color conversion tables based on designated data a1 through a7 and test density data C, M, Y entered by the operator with the selecting and pointing device 28.

The HL/SH density setting unit 29 normalizes the densities of highlights and shadows of density data C, M, Y supplied as input image data, with a density setting value of the designated data a1.

The tone curve setting unit 31 selects a basic tone curve, which is one of the color conversion functions, with the designated data a2, or corrects a basic tone curve with a curve correction coefficient indicated by the designated data a2 to establish a tone curve, and converts the gradations of the density data C, M, Y normalized by the HL/SH density setting unit 29 according to the established tone curve with respect to the density data C as a reference.

The signal rearranging calculator 33 compares the magnitudes of the components of the density data C, M, Y supplied from the HL/SH density setting unit 29 to determine a maximum value (max) and a minimum value (min) thereof.

The UCR calculator 35 calculates a UCR quantity with respect to each of the density data C, M, Y according to the maximum value (max) and the minimum value (min) from the signal rearranging calculator 33 and gray width control data and UCR intensity data based on the designated data a3 from the selecting and pointing device 28. The UCR quantity is then subtracted from the density data C, M, Y supplied from the tone curve setting unit 31 for a UCR process. If a UCA (Under Color Addition) process is to be carried out, then the UCR intensity data is established as a negative value, and an obtained UCA quantity is added to the density data C, M, Y.

The K plate generator 37 calculates density data K according to the maximum value (max) and the minimum value (min) from the signal rearranging calculator 33 and K plate width control data and K plate generating curve correction coefficient data based on the designated data a4 from the selecting and pointing device 28.

The halftone dot % gray balance setting unit 39 converts the density data C, M, Y which have been subjected to the UCR process, into density data C, M, Y proportional to halftone dot % capable of producing gray from equal amounts of density data C, M, Y, according to gray balance data based on the designated data a5 from the selecting and pointing device 28. The density data K from the K plate generator 37 is outputted as it is from the halftone dot % gray balance setting unit 39.

The halftone dot % setting unit 41 converts the density data C, M, Y, K from the halftone dot % gray balance setting unit 39 into halftone dot % data according to the halftone dot % of highlights and shadows based on the designated data a6 from the selecting and pointing device 28.

The color correcting unit 43 determines hues, lightnesses, and saturations from the density data C, M, Y from the HL/SH density setting unit 29, determines corrective quantities ΔC, ΔM, ΔY, ΔK for the density data C, M, Y, K according to a correction coefficient based on the designated data a7 from the selecting and pointing device 28, and adds the corrective quantities ΔC, ΔM, ΔY, ΔK to the halftone dot % data produced by the halftone dot % setting unit 41.

The color image processing system 10 shown in FIG. 1 is basically constructed as described above.

A process of generating the lookup tables Tj in the color conversion table generator 24 will be described below.

When the operator designates data a1 through a7 with the selecting and pointing device 28, predetermined color conversion functions are established in the HL/SH density setting unit 29, the tone curve setting unit 31, the UCR calculator 35, the K plate generator 37, the halftone dot % gray balance setting unit 39, the halftone dot % setting unit 41, and the color correcting unit 43. Then, test density data C, M, Y, e.g., density data C, M, Y, are produced as 8-bit data, and test data are generated by changing the density data C, M, Y in every 8 out of 256 levels and supplied to the color conversion table generator 24. Based on the relationship between the halftone dot % data C, M, Y, K produced by the halftone dot % setting unit 41 and to which the corrective quantities ΔC, ΔM, ΔY, ΔK are added, and the corresponding test data, the color conversion table generator 24 determines conversion data of lookup tables Tj (C, M, Y) (j=C, M, Y, K).

The conversion data of the lookup tables Tj tend to suffer tone jumps near the halftone dot % data C, M, Y, K if changes in the halftone dot % data C, M, Y, K with respect to changes dC, dM, dY in the density data C, M, Y are large.

Therefore, the smoothing circuit 22 smoothes the lookup tables Ti using a filter function Ap (dC, th, dY).

The filter function Ap stored in the filter function storage circuit 26 is selected by the operator using the selecting and pointing device 28, and supplied to the smoothing circuit 22. If attentional density data C, M, Y are smoothed using density data C+dC, M+dM, Y+dY (dC, dM, dY=−1, 0, 1) adjacent thereto, then smoothed lookup tables T'j are determined as follows:

$$T'j(C, M, Y) = \frac{\sum\sum_{dC,dM,dY=-1}^{1}\sum Tj(C+dC, M+dM, Y+dY) \cdot Ap(dC, dM, dY)}{a} \quad (1)$$

$$a = \sum\sum_{dC,dM,dY=-1}^{1}\sum Ap(dC, dM, dY)$$

Figure 3:
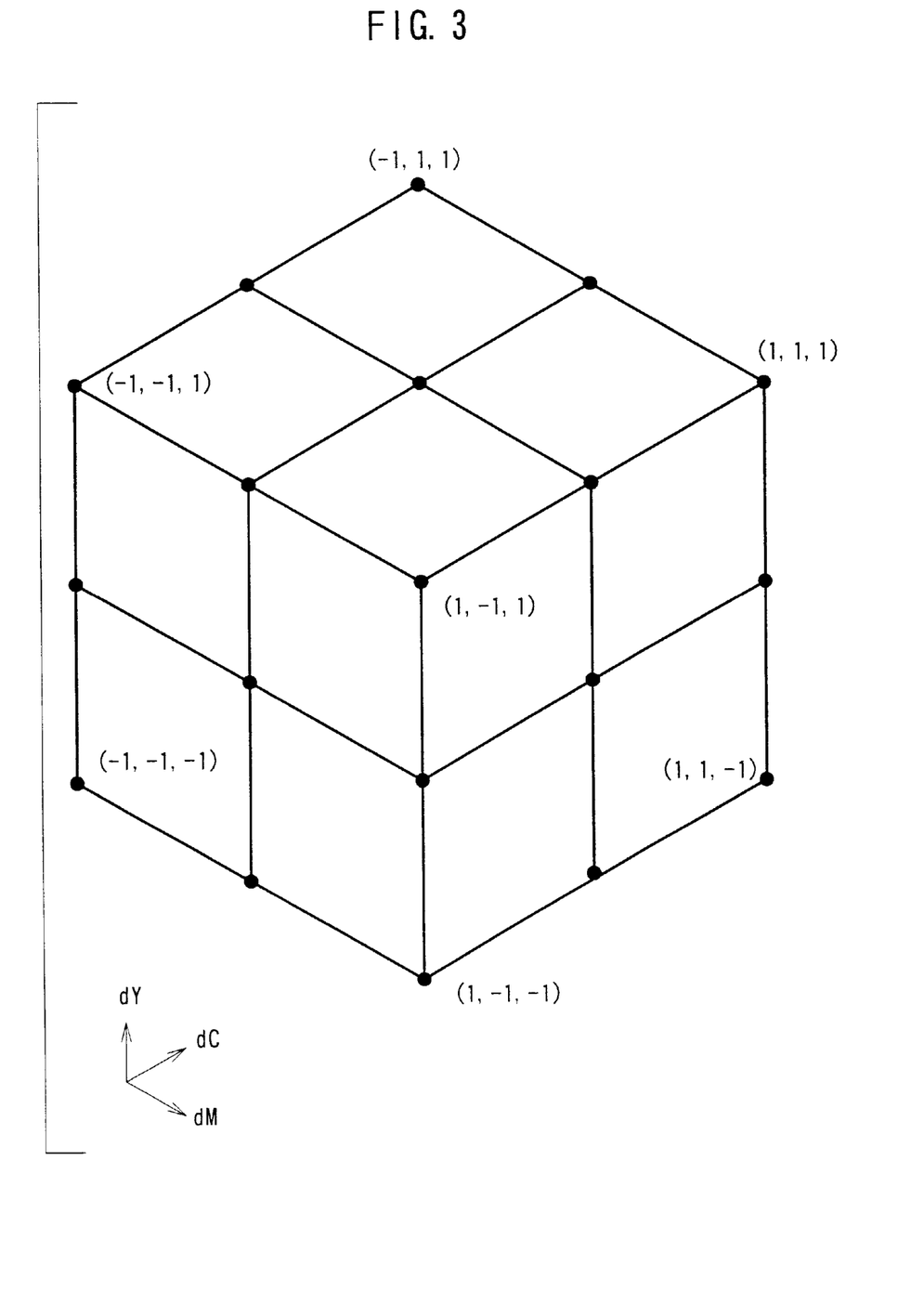
FIG. 3 is a diagram illustrative of a filter function.
Figure 4A:
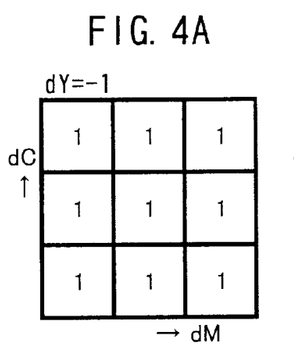
FIGS. 4A through 4C are diagrams illustrative of examples of a filter coefficient of the filter function.
Figure 4B:
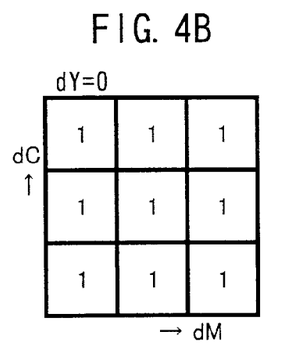
Figure 4C:
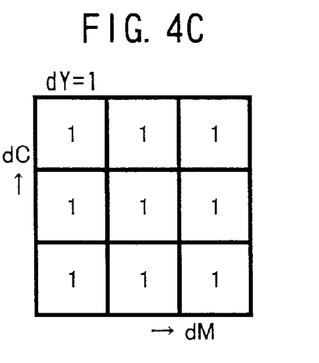
Figure 5A:
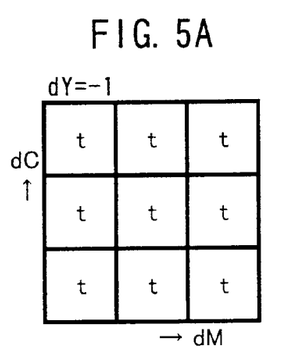
FIGS. 5A through 5C are diagrams illustrative of other examples of a filter coefficient of the filter function.
Figure 5B:
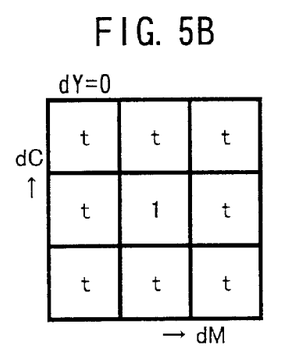
Figure 5C:
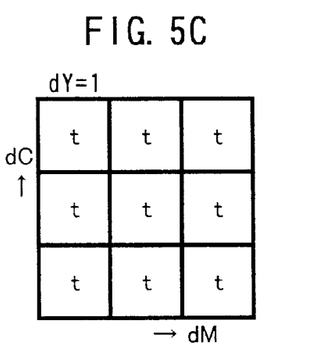
Figure 6A:
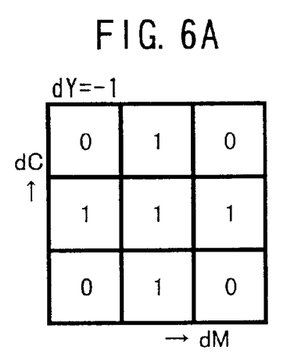
FIGS. 6A through 6C are diagrams illustrative of still other examples of a filter coefficient of the filter function.
Figure 6B:
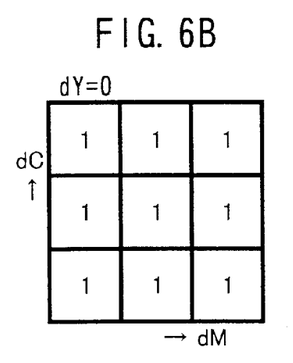
Figure 6C:
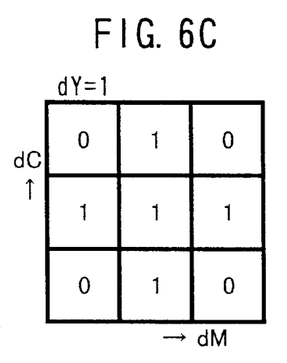
Figure 7A:
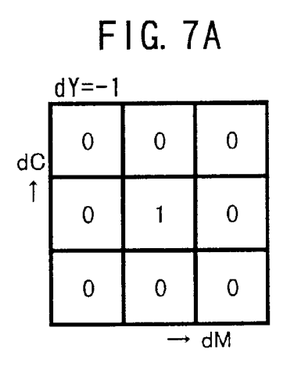
FIGS. 7A through 7C are diagrams illustrative of yet other examples of a filter coefficient of the filter function.
Figure 7B:
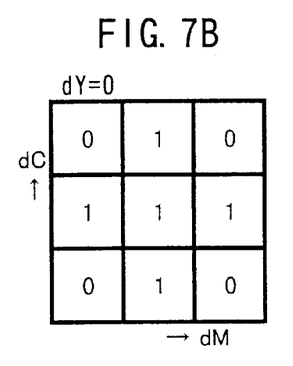
Figure 7C:
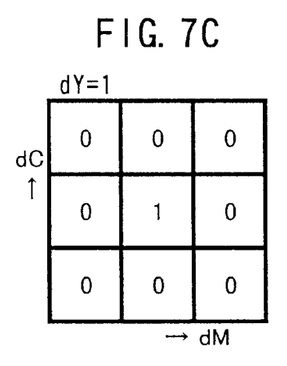

As shown in FIG. 3, if the attentional density data C, M, Y are positioned at the center of a cube and filter coefficients of the filter function Ap are at positions indicated by circular dots adjacent to the center of the cube, then the filter coefficients of the filter function Ap may be established as shown in FIGS. 4A through 4C. Alternatively, the filter coefficients of the filter function Ap may be established as shown in FIGS. 5A through 5C, 6A through 6C, or 7A through 7C. In FIGS. 5A through 5C, "t" falls in the range of 0<t<1. The filter coefficients may be established in a range wider than the range of 3×3×3 density data C, M, Y.

The lookup tables T′j thus smoothed are supplied to the color processing circuit 14. The color processing circuit 14 effects a color conversion process on the density data C, M, Y supplied from the calibration circuit 12 using the lookup tables T′j, thereby generating halftone dot % data C, M, Y, K. Since the halftone dot % data C, M, Y, K are generated using the smoothed lookup tables T′j, an image generated on the basis of the halftone dot % data C, M, Y, K is essentially free of undesired defects such as tone jumps.

Figure 8:
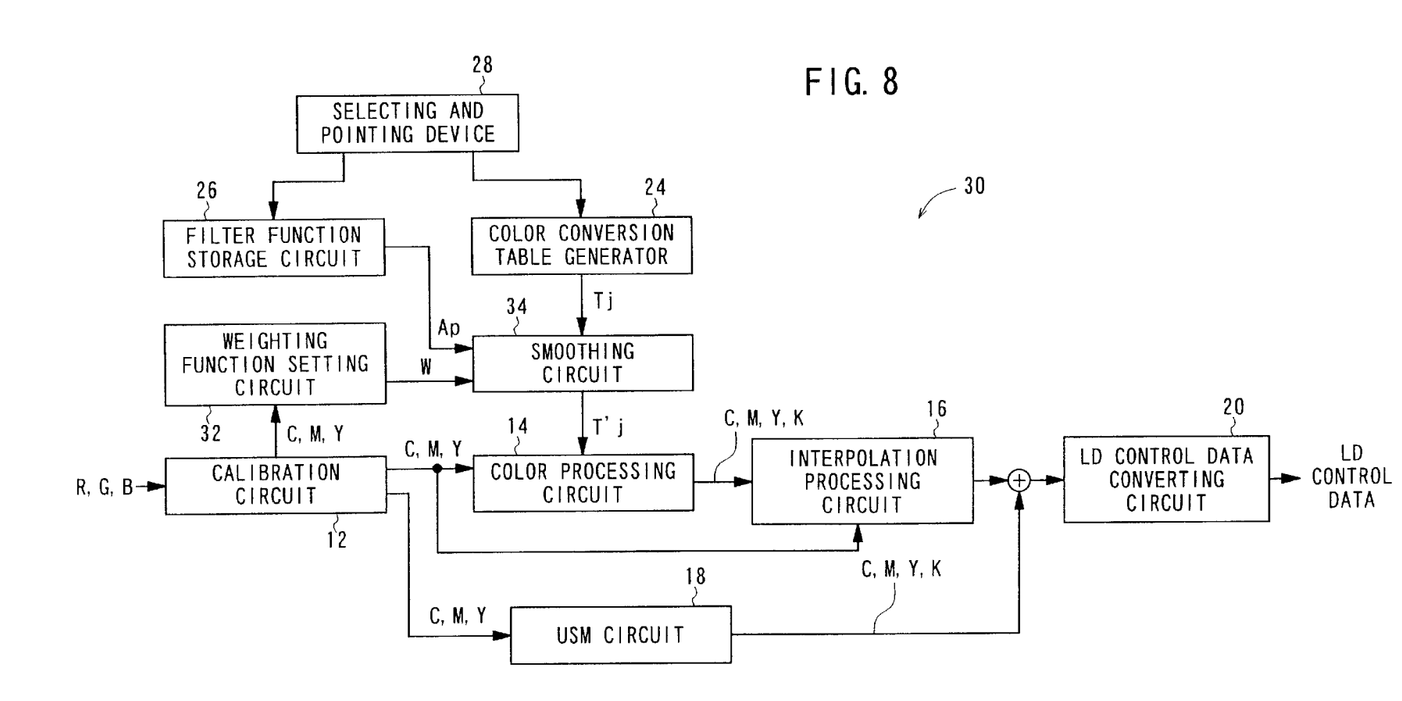
FIG. 8 is a block diagram of another color image processing system incorporating a method of and an apparatus for processing image data according to the present invention.

In the above embodiment, the same smoothing process is effected on the full range of density data C, M, Y. However, the filter function Ap may be weighted depending on density data C, M, Y to effect the smoothing process depending on the density data C, M, Y. FIG. 8 shows in block form another color image processing system 30 which carries out such a weighting process.

Those parts shown in FIG. 8 which are identical to those shown in FIG. 1 are denoted by identical reference characters, and will not be described in detail.

The color image processing system 30 includes a weighting function setting circuit 32 which establishes a weighting function W (C, M, Y) based on the density data C, M, Y from the calibration circuit 12, and supplies the weighting function W (C, M, Y) to a smoothing circuit 34. Using the lookup tables Tj (C, M, Y), the filter function Ap (dC, dM, dY), and the weighting function W (C, M, Y), the smoothing circuit 34 determines smoothed lookup tables T′j as follows:

$$T'j(C, M, Y) = \frac{\sum_{dC, dM, dY=-1}^{1} Tj(C+dC, M+dM, Y+dY) \cdot Ap(dC, dM, dY) \cdot W(C, M, Y)}{b(C, M, Y)} \quad (2)$$

$$b(C, M, Y) = \sum_{dC, dM, dY=-1}^{1} Ap(dC, dM, dY) \cdot W(C, M, Y)$$

The filter coefficients of the filter function Ap may be established in a range wider than the range of 3×3×3 density data C, M, Y. If dC=dM=dY=0, then W (C, M, Y)=1.

The weighting function W (C, M, Y) is established to smooth more intensively a region of an input signal space where input image data are concentrated. For example, if density data C, M, Y supplied as input image data are 8-bit data, then the image data space is divided four regions of 0 through 63, 64 through 127, 128 through 191, and 192 through 255 for each of the colors C, M, Y, the density data C, M, Y contained in each of the regions represented by 4×4×4=64 are counted, and the count is expressed as a histogram function H (C, M, Y) of the density data C, M, Y representing the density average of each of the regions.

The histogram function H (C, M, Y) is defined as a quadratic function expressed by:

$$H(C, M, Y)=b1 \cdot C^2+b2 \cdot M^2+b3 \cdot Y^2+b4 \cdot C \cdot M+b5 \cdot M \cdot Y+b6 \cdot Y \cdot C+b7 \cdot C+b8 \cdot M+b9 \cdot Y+b10 \quad (3)$$

By applying the counts of the density data C, M, Y in the regions to the histogram function H (C, M, Y), coefficients b1 through b10 thereof are determined according to the method of least squares.

Using the histogram function H (C, M, Y) thus determined and its maximum value Hmax, the weighting function W (C, M, Y) is defined as follows:

$$W(C, M, Y)=H(C, M, Y)/Hmax\ (H(C, M, Y)>0) \quad (4)$$

$$W(C, M, Y)=0(H(C, M, Y)\leq 0) \quad (5)$$

The lookup tables T′j thus smoothed according to the equation (2) are supplied to the color processing circuit 14. The color processing circuit 14 effects a color conversion process on the density data C, M, Y supplied from the calibration circuit 12 using the lookup tables T′j, thereby generating halftone dot % data C, M, Y, K. The halftone dot % data C, M, Y, K are generated such that more frequent density data C, M, Y are smoothed more intensively than less frequent density data C, M, Y. Therefore, an image with less density changes is processed into an image essentially free of tone jumps by the smoothing process, and an image with more density changes has gradations reproduced more intensively because it is less subjected to the smoothing process.

The regions for which to determine histograms may not necessarily be divided as equal regions. A highlight zone may be divided into smaller regions, and a shadow zone may be divided into greater regions, so that the weighting process will be effected on smaller regions in a more noticeable image zone.

Figure 9:
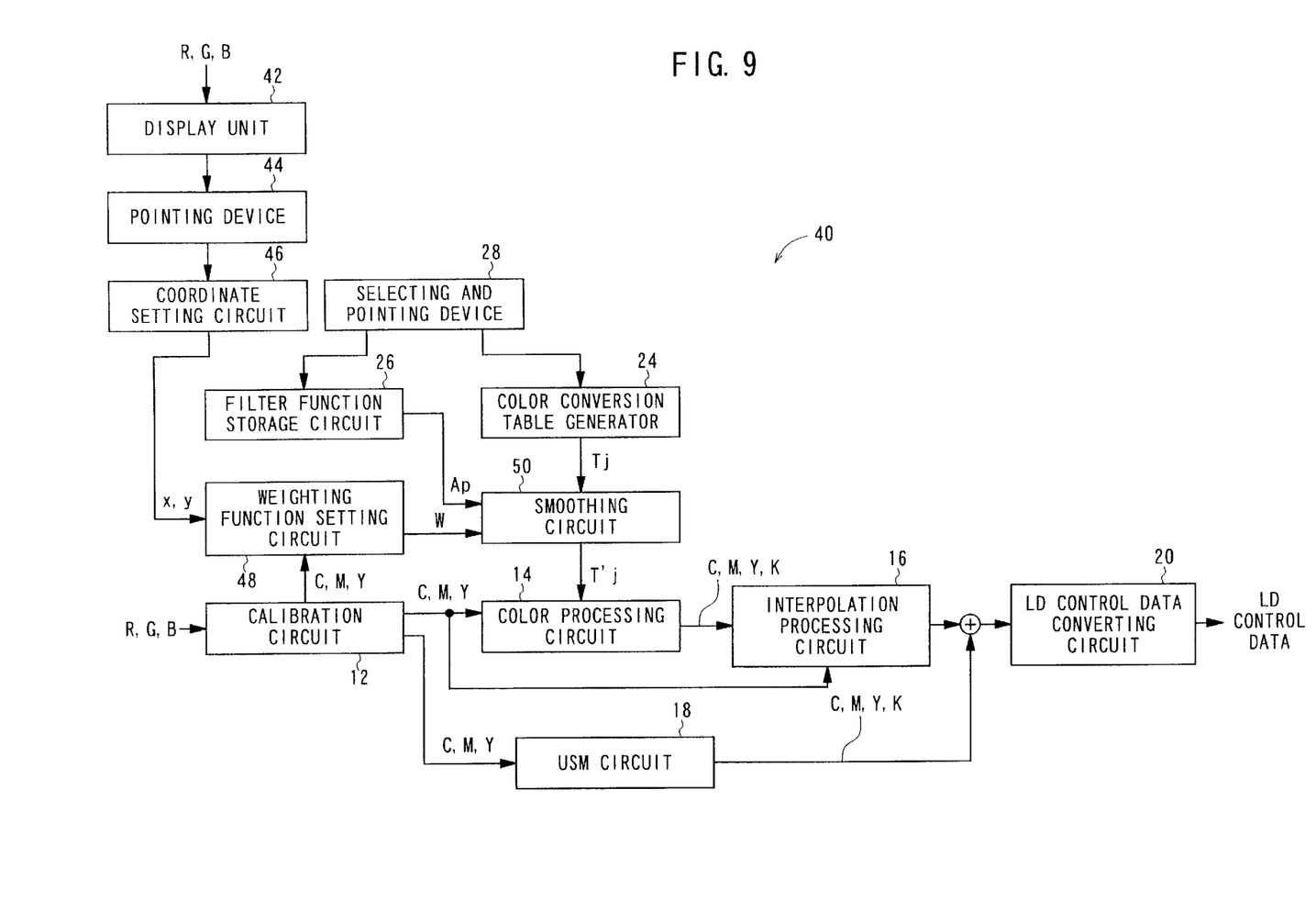
FIG. 9 is a block diagram of still another color image processing system incorporating a method of and an apparatus for processing image data according to the present invention.

The weighting function W (C, M, Y) may be established with respect to particular density data C, M, Y. FIG. 9 shows in block form still another color image processing system 40 which carries out such a weighting process.

Those parts shown in FIG. 9 which are identical to those shown in FIG. 1 are denoted by identical reference characters, and will not be described in detail.

In FIG. 9, image data R, G, B entered from a scanner or the like are supplied to the calibration circuit 12 and a display unit 42. The display unit 42 displays a color image based on the supplied image data R, G, B. The operator designates the position of colors to be smoothed in the displayed color image, with a pointing device 44 such as a mouse or the like. A coordinate setting circuit 46 supplies coordinates (x, y) of the position designated by the pointing device 44 to a weighting function setting circuit 48.

The weighting function setting circuit 48 determines density data C, M, Y corresponding to the coordinates (x, y) from the density data C, M, Y supplied from the calibration circuit 12. The weighting function setting circuit 48 establishes a weighting function W (C, M, Y) whose intensity is maximum at the determined density data C, M, Y and progressively smaller away from the determined density data C, M, Y, as follows:

$$W(C, M, Y)=1-dd(C, M, Y)/r(dd(C, M, Y)<r) \quad (6)$$

$$W(C, M, Y)=0(dd(C, M, Y)\geq r) \quad (7)$$

where dd(C, M, Y) is defined as:

$$dd(C, M, Y)=\sqrt{((CP-C)^2+(MP-M)2+(YP-Y)^2)} \quad (8)$$

where CP, MP, YP represent maximum values, respectively, of the density data C, M, Y, and r is defined as a maximum value of:

$$r=\sqrt{(dC^2+dM^2+dY^2)} \quad (9)$$

The weighting function W (C, M, Y) thus established is supplied to a smoothing circuit 50, which applies the supplied weighting function W (C, M, Y) to the equation (2) for thereby determining lookup tables T'j. The color processing circuit 14 converts the density data C, M, Y into halftone dot % data C, M, Y, K according to the lookup tables T'j. The produced halftone dot % data C, M, Y, K have been smoothed only with respect to a region around desired colors.

If r in the equation (9) is established as a function of the density data C, M, Y according to:

$$r(C, M, Y) = k \cdot \sqrt{(dC^2 + dM^2 + dY^2)} \quad (10)$$

where k is a constant, then a region of a high density can be smoothed in a wide range.

Although certain preferred embodiments of the present invention have been shown and described in detail, it should be understood that various changes and modifications may be made therein without departing from the scope of the appended claims.

What is claimed is:

1. A method of processing image data, comprising the steps of:
    smoothing conversion data established according to predetermined image processing conditions, using a predetermined filter function selected by user there by producing new conversion data; and
    converting input image data into output image data using said new conversion data;
    wherein said step of smoothing conversion data comprises the steps of:
        determining a histogram in an input signal space from said input image data;
        weighting said filter function based on said histogram;
        smoothing more frequent data of said input image data more intensively; and
        smoothing less frequent data of said input image data less intensively.

2. A method according to claim 1, wherein said histogram is generated by dividing said input signal space into a plurality of regions and determining a count of input image data in each of said regions with respect to an average count of the input image data with respect to said regions.

3. A method according to claim 2, wherein said regions include smaller regions with respect to a highlight zone of the input image data and larger regions with respect to a shadow zone of the input image data.

4. A method according to claim 1, wherein said new conversion data T'j (C, M, Y) are determined from the conversion data Tj (C+dC, M+dM, Y+dY) to be smoothed, using said filter function Ap (dC, dM, dY) and a weighing function W (C, M, Y) for weighting the filter function Ap (dC, dM, dY) based on said histogram, as follows:

$$T'j(C, M, Y) = \frac{\sum_{dC, dM, dY=-1}^{1} \sum \sum Tj(C+dC, M+dM, Y+dY) \cdot Ap(dC, dM, dY) \cdot W(C, M, Y)}{b(C, M, Y)},$$

$$b(C, M, Y) = \sum_{dC, dM, dY=-1}^{1} \sum \sum Ap(dC, dM, dY) \cdot W(C, M, Y)$$

5. A method of processing image data, comprising the steps of:
    establishing predetermined color conversion functions using designated data and test density data selected by a user;
    generating color conversation data with a color conversion table generator using said color conversion functions;
    smoothing said conversion data using a predetermined filter function selected by the user, thereby producing new conversion data; and
    converting input image data into output image data using said new conversion data,
    wherein said filter function comprises a function having filter coefficients for smoothing attentional input image data with input image data around the attentional input image data.

6. A method according to claim 5, wherein said filter coefficients comprise coefficients for averaging the attentional input image data with the input image data around the attentional input image data.

7. A method according to claim 5, wherein said filter coefficients comprise coefficients for weighting said filter function around the attentional input image data.

8. A method of processing image data, comprising the steps of:
    smoothing conversion data established according to predetermined image processing conditions, using a predetermined filter function thereby producing new conversion data; and
    converting input image data into output image data using said new conversion data;
    wherein said new conversion data Tj (C, M, Y) are determined from the conversion data Tj (C+dC, M+dM, Y+dY) to be smoothed, using said filter function Ap (dC, dM, dY), as follows:

$$T'j(C, M, Y) = \frac{\sum_{dC, dM, dY=-1}^{1} \sum \sum Tj(C+dC, M+dM, Y+dY) \cdot Ap(dC, dM, dY)}{a},$$

where $$a = \sum_{dC, dM, dY=-1}^{1} \sum \sum Ap(dC, dM, dY).$$

9. A method of processing image data, comprising the steps of:
    smoothing conversion data established according to predetermined image processing conditions, using a predetermined filter function, thereby producing new conversion data;
    converting input image data into output image data using said new conversion data;
    displaying an image based on said input image data;
    designating a point on the displayed image; and
    weighting said filter function around a portion of said input image data which corresponds to the designated point (x, y);
    wherein said weighting function W (C, M, Y) for weighting the filter function is defined as follows:

$$W(C, M, Y) = 1 - dd(C, M, Y)/r(dd(C, M, Y) < r)$$

$$W(C, M, Y) = 0 (dd(C, M, Y) \geq r),$$

where dd (C, M, Y) is defined as:

$$dd(C, M, Y) = \sqrt{((CP-C)^2 + (MP-M)^2 + (YP-Y)^2)}$$

where CP, MP, YP represent maximum values, respectively, of the density data C, M, Y of said designated point (x, y), and r is defined as a maximum value of:

$$r = \sqrt{(dC^2 + dM^2 + dY^2)}.$$

10. A method of processing image data, comprising the steps of:

smoothing conversion data established according to predetermined image processing conditions, using a predetermined filter function, thereby producing new conversion data;

converting input image data into output image data using said new conversion data;

displaying an image based on said input image data;

designating a point on the displayed image; and weighting said filter function around a portion of said input image data which corresponds to the designated point (x, y);

wherein said weighting function W (C, M, Y) for weighting the filter function is defined as follows:

$$W(C, M, Y) = 1 - dd(C, M, Y)/r \, (dd(C, M, Y) < r)$$

$$W(C, M, Y) = 0 \, (dd(C, M, Y) > r),$$

where dd (C, M, Y) is defined as:

$$dd(C, M, Y) = \sqrt{((CP-C)^2 + (MP-M)^2 + (YP-Y)^2)}$$

where CP, MP, YP represent maximum values, respectively, of the density data C, M, Y of said designated point (x, y), and r is defined as a function of:

$$r(C, M, Y) = k \cdot \sqrt{(dC^2 + dM^2 + dY^2)}$$

where k is a constant.

11. An apparatus for processing image data, comprising:

a conversion data generator for generating color conversion data, said color conversion data being established using predetermined color conversion functions determined from designated data and test density data selected by a user;

a filter function storage circuit for storing a filter function selected by the user;

a smoothing circuit for smoothing said conversion data using said filter function, thereby producing new conversion data; and a processing circuit for converting input data into output image data using said new conversion data;

wherein said conversion data generator comprises a shadow and highlight density setting unit receiving a density setting value supplied by a user to normalize densities in the input image.

12. The apparatus of claim 11, wherein said conversion data generator further comprises a signal arranging calculator receiving an output of the shadow and highlight density setting unit to determine a minimum and maximum value of density.

13. The apparatus of claim 12, wherein said conversion data generator further comprises a halftone gray balance circuit using a result of the signal arranging calculator and further receiving a user input to provide gray balance data used in generating said color conversion data.

14. The apparatus of claim 13, wherein said test density data comprises the input image data with changes in selected levels of the input image.

15. A method of processing image data, comprising the steps of:

establishing predetermined color conversion functions using designated data and test density data selected by a user;

generating color conversation data with a color conversion table generator using said color conversion functions;

smoothing said conversion data using a predetermined filter function selected by the user, thereby producing new conversion data; and converting input image data into output image data using said new conversion data, further comprising: receiving a user input to provide gray balance data used in generating said color conversion data.

16. The method according to claim 15, wherein said test density data comprises the input image data with changes in selected levels of the input image.

17. The method according to claim 16, wherein said smoothing comprises:

determining a histogram in an input signal space from said input image data;

smoothing more frequent data of said input image data more intensively and smoothing less frequent data of said input image data less intensively.

* * * * *